(12) United States Patent
Shao et al.

(10) Patent No.: US 7,912,382 B2
(45) Date of Patent: Mar. 22, 2011

(54) OPTICAL-ELECTRICAL TRANSMITTING DEVICE

(75) Inventors: Zhenhua Shao, Alhambra, CA (US); Xu Huang, Torrance, CA (US); Masataka Ito, Torrance, CA (US); Dongdong Wang, Rancho Palos Verdes, CA (US)

(73) Assignee: Ibiden Co., Ltd., Ogaki-shi (JP)

( * ) Notice: Subject to any disclaimer, the term of this patent is extended or adjusted under 35 U.S.C. 154(b) by 622 days.

(21) Appl. No.: 11/857,733

(22) Filed: Sep. 19, 2007

(65) Prior Publication Data
US 2008/0075465 A1 Mar. 27, 2008

Related U.S. Application Data

(60) Provisional application No. 60/853,422, filed on Oct. 23, 2006, provisional application No. 60/845,522, filed on Sep. 19, 2006.

(51) Int. Cl.
*H04B 10/02* (2006.01)
*H04B 10/06* (2006.01)

(52) U.S. Cl. .................. 398/208; 398/175; 398/177
(58) Field of Classification Search .................. 398/161, 398/175–177, 202, 208–211
See application file for complete search history.

(56) References Cited

U.S. PATENT DOCUMENTS

| 5,394,490 A | 2/1995 | Kato et al. |
| 6,122,323 A * | 9/2000 | Johnson ........................ 375/259 |
| 6,219,336 B1 * | 4/2001 | Takahashi et al. ............ 370/223 |
| 6,295,152 B1 * | 9/2001 | Wedding ....................... 398/209 |
| 6,337,886 B1 * | 1/2002 | Asahi ............................ 375/316 |
| 7,212,600 B1 * | 5/2007 | Dauth ........................... 375/376 |

FOREIGN PATENT DOCUMENTS

JP 10-135407 5/1998

* cited by examiner

*Primary Examiner* — Dalzid Singh
(74) *Attorney, Agent, or Firm* — Oblon, Spivak, McClelland, Maier & Neustadt, L.L.P.

(57) ABSTRACT

An optical-electrical transmitting device for transmitting a signal includes an electrical signal transmitting circuit which divides a transmission signal into a first transmission signal and a second transmission signal, a switching device which is electrically connected to receive and converts the first signal into an identification signal for determining the transmission signal to be one of a fast signal and a slow signal, and a selector which is electrically connected to receive the second transmission signal and the identification signal and outputs the second transmission signal to an optical waveguide when the transmission signal is determined to be the fast signal and an electrical wiring when the transmission signal is determined to be the slow signal, the optical waveguide optically connecting the electrical signal transmitting circuit to an electrical signal receiving circuit, the electrical wiring electrically connecting the electrical signal transmitting circuit to the electrical signal receiving circuit.

18 Claims, 3 Drawing Sheets

Signals from Cycle Determining Portion 122

Signals from Cycle Determining Portion 122

OPTICAL-ELECTRICAL TRANSMITTING DEVICE

CROSS-REFERENCE TO RELATED APPLICATIONS

The present application claims the benefits of priority to U.S. Applications Nos. 60/845,522, filed Sep. 19, 2006, and 60/853,422, filed Oct. 23, 2006. The contents of those applications are incorporated herein by reference in their entirety.

BACKGROUND OF THE INVENTION

1. Field of the Invention

The present invention is related to an optical-electrical transmitting device.

2. Discussion of the Background

Japanese Patent Laid-Open Publication Hei 10-135407 describes a system for changing means for transmitting signals between a semiconductor integrated circuit apparatus and an external apparatus connected to the semiconductor integrated circuit apparatus, where data signals are transmitted optically and power source and drive signals are transmitted electrically. The contents of this reference are incorporated herein by reference in its entirety.

SUMMARY OF THE INVENTION

According to one aspect of the present invention, an optical-electrical transmitting device for transmitting a signal includes an electrical signal transmitting circuit which divides a transmission signal into a first transmission signal and a second transmission signal, a switching device which is electrically connected to receive and converts the first signal into an identification signal for determining the transmission signal to be one of a fast signal and a slow signal, and a selector which is electrically connected to receive the second transmission signal and the identification signal and outputs the second transmission signal to an optical waveguide when the transmission signal is determined to be the fast signal and an electrical wiring when the transmission signal is determined to be the slow signal, the optical waveguide optically connecting the electrical signal transmitting circuit to an electrical signal receiving circuit, the electrical wiring electrically connecting the electrical signal transmitting circuit to the electrical signal receiving circuit.

According to another aspect of the present invention, an optical interconnect device includes an optical-electrical transmitting device for transmitting a signal including an electrical signal transmitting circuit which divides a transmission signal into a first transmission signal and a second transmission signal, a switching device which is electrically connected to receive and converts the first signal into an identification signal for determining the transmission signal to be one of a fast signal and a slow signal, and a selector which is electrically connected to receive the second transmission signal and the identification signal and outputs the second transmission signal to an optical waveguide when the transmission signal is determined to be the fast signal and an electrical wiring when the transmission signal is determined to be the slow signal, the optical waveguide optically connecting the electrical signal transmitting circuit to an electrical signal receiving circuit, the electrical wiring electrically connecting the electrical signal transmitting circuit to the electrical signal receiving circuit.

According to yet another aspect of the present invention, a mobile equipment device includes an optical-electrical transmitting device for transmitting a signal including an electrical signal transmitting circuit which divides a transmission signal into a first transmission signal and a second transmission signal, a switching device which is electrically connected to receive and converts the first signal into an identification signal for determining the transmission signal to be one of a fast signal and a slow signal, and a selector which is electrically connected to receive the second transmission signal and the identification signal and outputs the second transmission signal to an optical waveguide when the transmission signal is determined to be the fast signal and an electrical wiring when the transmission signal is determined to be the slow signal, the optical waveguide optically connecting the electrical signal transmitting circuit to an electrical signal receiving circuit, the electrical wiring electrically connecting the electrical signal transmitting circuit to the electrical signal receiving circuit.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
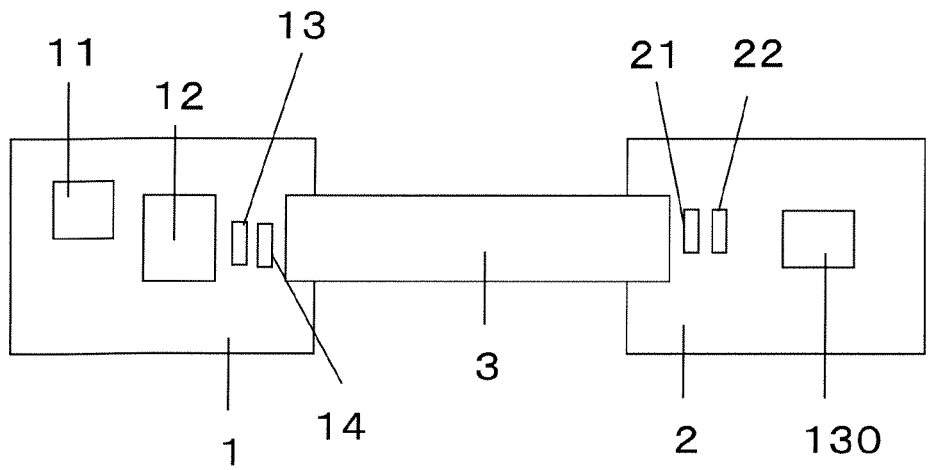
FIG. 1 is a top view illustrating an optical-electrical transmitting device according to one embodiment of the present invention.

The embodiments will now be described with reference to the accompanying drawings, wherein like reference numerals designate corresponding or identical elements throughout the various drawings.

FIG. 1 is a top view illustrating an optical-electrical transmitting device according to one embodiment of the present invention. Referring to FIG. 1, an optical-electrical transmitting device has first substrate 1, second substrate 2 and transmission substrate 3, which transmits signals between first substrate 1 and second substrate 2. On first substrate 1, components such as logic 11, switching element 12, driver 13, and laser diode 14 are mounted. On second substrate 2, components such as photodiode 21, amplifier 22, and switch 130 are mounted. On transmission substrate 3, an electrical circuit and an optical waveguide are formed to transmit signals between first substrate 1 and second substrate 2. The laser diode is preferably an edge-emitting type, and the photodiode is preferably an edge-receiving type. Also, the laser diode is preferably single mode, and the optical waveguide is preferably multimode.

Figure 2:
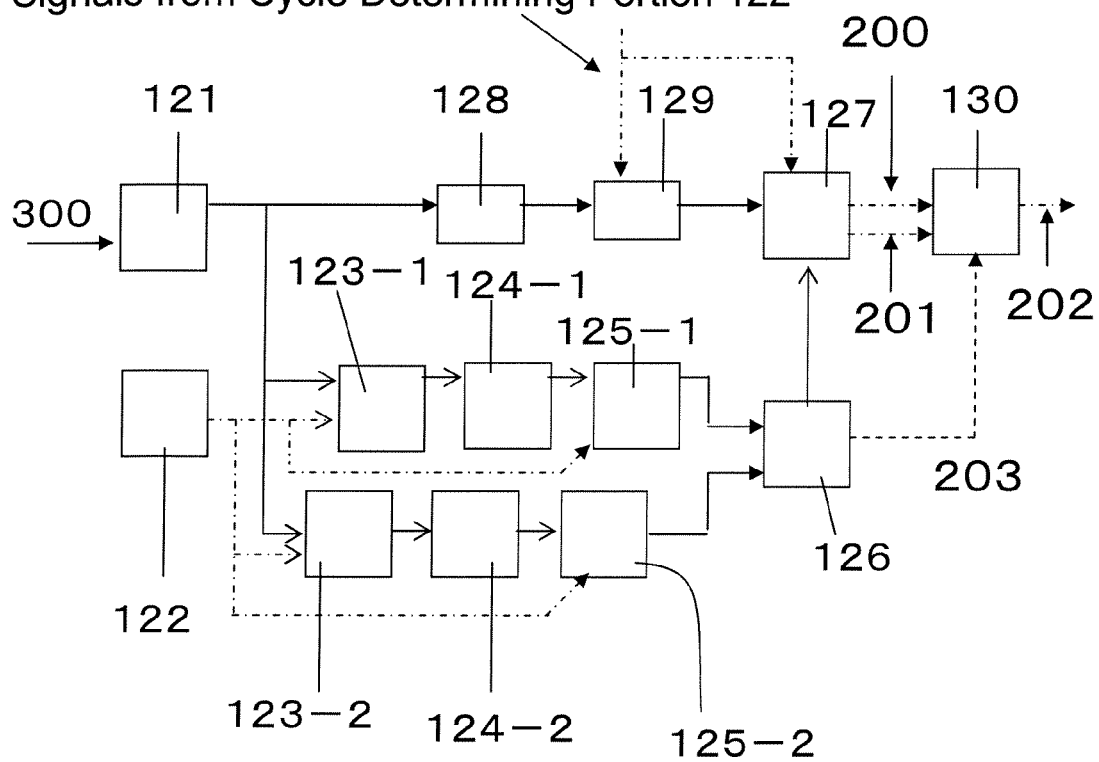
FIG. 2 is a schematic diagram illustrating a switching element of the optical-electrical transmitting device shown in FIG. 1.
Figure 3:
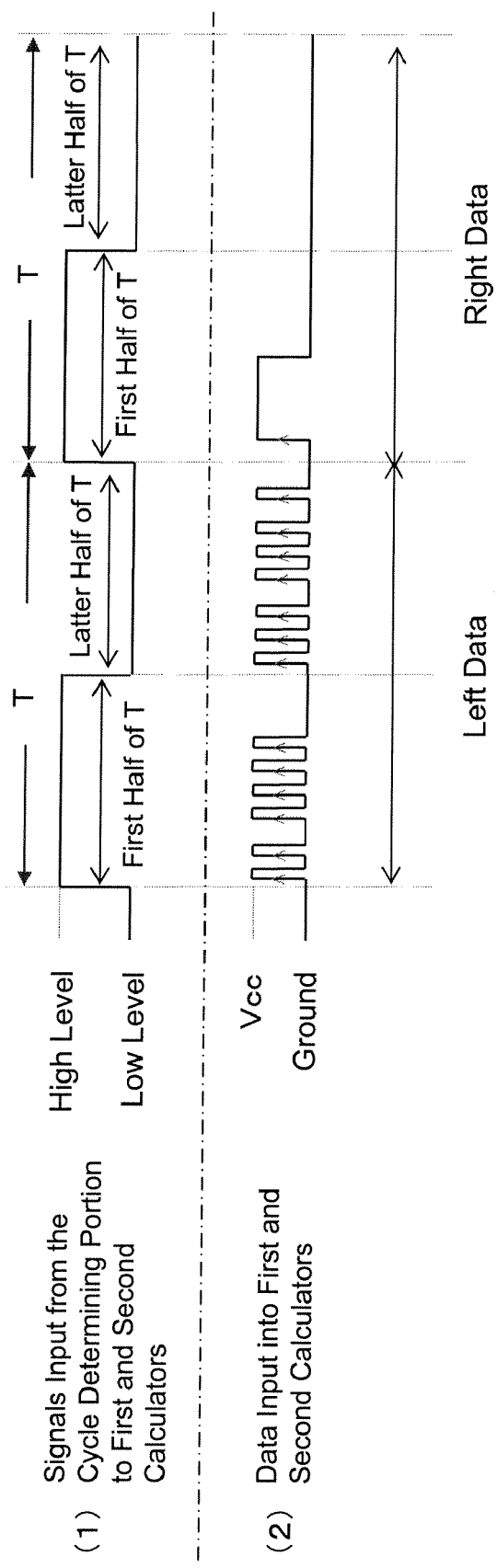
FIG. 3 is a view illustrating results calculated at a switching element according to an embodiment of the present invention.

FIG. 2 is a schematic diagram illustrating a switching element of the optical-electrical transmitting device shown in FIG. 1. Referring to FIG. 2, switching element 12 is a component which determines means to be used when transmitting signals from first substrate 1 to second substrate 2 (either optical or electrical means). As illustrated in FIG. 2, switching element 12 has level converter 121, cycle determining element 122 (may also be referred to as "standard cycle generator"), first counter 123-1, second counter 123-2, first comparator 124-1, second comparator 124-2, first retaining circuit 125-1, second retaining circuit 125-2, accumulator 126, selector 127, delay line 128 and buffer 129. FIG. 3 is a view illustrating results calculated at a switching element according to an embodiment of the present invention, and the role of each of the components is described below with reference to FIGS. 2 and 3. FIG. 3 illustrates information regarding two cycles of data to be calculated after being input to the switching element. The level converter converts data which are input to the input element so that the data are processed at the switching element. Depending on data or other factors, Vcc and ground levels of input data 300 may not be constant before being processed at the switching element. Level converter 121 has the function of converting Vcc and ground of input data 300 to a predetermined Vcc-constant and ground-constant. For example, input data having 3.3V at Vcc and 0.8V at ground are converted by the level converter to data having 2.2V at Vcc and 0.2V at ground. Input data having 1.8V at Vcc and 1.2V at ground are also converted by the level converter to data having 2.2V at Vcc and 0.2V at ground. Data having different voltages are also converted by the level converter to data having 2.2V at Vcc and 0.2V at ground. The values, 2.2V at Vcc-constant and 0.2V at ground-constant, are example voltages. As described above, since the level converter converts input signals 300 so that the data can be processed at the switching element, the level converter is not necessary if input data 300 are ready to be processed at the switching element. The data converted by the level converter are transmitted to selector 127 through delay line 128 and buffer 129. The data are retained at buffer 129 and then output cycle by cycle to the selector according to the signal (a clock signal) input from cycle determining element 122. The data, which are processed at the level converter, are transmitted to selector 127. At the same time, the data are transmitted to first counter 123-1 and second counter 123-2 to obtain information about whether the data are a fast signal or a slow signal. When the data reach the counters, the number transmitted from ground to Vcc is counted. To determine if the transmitted data are a fast signal or a slow signal, the time as well as the information regarding the number is used. Therefore, information regarding cycle (T) is input from cycle determining element 122 to first counter 123-1 and second counter 123-2 (see (1) of FIG. 3). Based on cycle (T), first counter 123-1 and second counter 123-2 count the number which is transmitted from ground to Vcc (a transmission number) within a predetermined time (the number may also be counted when transmitted from Vcc to ground). For example, the first counter counts the number when the data are received from the cycle determining element at the high level Vcc. The second counter counts the number when the data are received from the cycle determining element at the low level (ground). As illustrated in (2) of FIG. 3, the same data are transmitted to the first counter and the second counter continuously. A transmission number of data input in a sequence is counted continuously by a cycle (T) using the first counter and second counter. The first counter counts the number transmitted during the first half of cycle (T) and the second counter counts the number transmitted during the latter half. In the illustration, two cycles of waveforms are illustrated as an example (with reference to (2) FIG. 3, the data on the left cycle (T) are referred to as left data and the data on the right cycle (T) are referred to as right data). However, in actuality, continuous data are input to the counters. The transmission number of the left data is six (6) during the first half of cycle (T) and seven (7) during the latter half and the transmission number of the right data is one (1) during the first half of cycle (T) and zero (0) during the latter half. Left data and right data are continuous, but are one cycle off from each other. The first counter may count the number at the low level and the second counter may count the number at the high level. The cycle (T) may be either fixed or variable, but variable cycles are preferred. At the first counter, the information regarding the number counted at the high level of a cycle (the final information on the number of the left data: six (6); the final information on the number of the right data: one (1)) is transmitted to first comparator 124-1. At the first comparator, the number information received from the first counter is compared with the number retained at the first comparator (for example, five (5)). Then, when the received information on the number is the same as or greater than the number retained at the first comparator, a signal is output from first comparator 124-1 to first retaining circuit 125-1 to accumulator 126 that the data whose transmission number is counted at the first counter are fast signals. The determined result is retained for one cycle at first retaining circuit 125-1 and accumulator 126. The same are conducted at second counter 123-2, second comparator 124-2, second retaining circuit 125-2 and accumulator 126. Namely, at the second counter, information regarding the number counted at the low level during one cycle (the final information on the number of the left data: seven (7); the final information on the number of the right data: zero (0)) is transmitted to second comparator 124-2. At the second comparator, the information on the number received from the second counter is compared with the number retained at the second comparator (for example, five (5)). Then, when the received information on the number is the same as or greater than the number retained at the second comparator, a signal is output from second comparator 124-2 to second retaining circuit 125-2 to accumulator 126 that the data whose transmission number is counted at the second counter are fast signals. The determined result is retained for one cycle at second retaining circuit 125-2 and accumulator 126. In the above, examples are described when the result is determined to be fast. The following describes examples when the result is determined to be slow. After the counting is finished (after the first half of a cycle is finished at the first counter and after a cycle is finished at the second counter), the first counter and second counter are reset (the transmission number becomes zero (0)). The data retained at the first retaining circuit, second retaining circuit and accumulator (one (1) if fast, or zero (0) if slow) are reset by the cycle to be zero (0). Then, if the transmission number counted at the first counter does not reach the number information retained at the first comparator during one cycle (the first half of cycle (T)), the first determined result retained at the first retaining circuit and accumulator is slow (zero (0)). The second result is determined the same way. If the transmission number counted at the second counter does not reach the number information retained at the second comparator during one cycle (the latter half of cycle (T)), the second determined result retained at the second retaining circuit and accumulator is slow (zero (0)). Based on a determined result input through the first retaining circuit to the accumulator (the first determined result) and another determined result input through the second retaining circuit to the accumulator (the second determined result), the accumulator generates an accumulated determined result. The accumulated determined result is determined to be fast if at least either the first determined result or the second determined result is fast (one (1)). Buffer 129 outputs the data to selector 127 based on the clock signal from cycle determining element 122. Selector 127 picks up the accumulated determined result generated at the accumulator based on the clock signal from cycle determining element 122. Then, based on the accumulated determined result, the data which reach selector 127 from buffer 129 is output either to the optical circuit or to the electrical circuit on the transmission substrate. At that time, the data determined to be a fast signal at the accumulator is output to the optical circuit on the transmission substrate via the driver and the laser diode, and the data determined to be a slow signal is output to the electrical circuit. When transmitting electrically, it is preferred to switch off the driver IC, laser diode, photodiode and amplifier to turn off the optical transmission circuit. Also, the accumulator outputs the accumulated determined result to switch 130 (signal 203). The data transmitted to the second substrate via the optical waveguide on the transmission substrate reach switch 130 via photodiode 21 and amplifier 22 (200 in FIG. 2, route 200). Data transmitted to the second substrate via the electrical circuit on the transmission substrate also reach switch 130 (201 in FIG. 2, route 201). Based on signal 203 (may also be referred to as "an identification signal") from the accumulator, switch 130 recognizes which of route 200 or route 201 is to be used to transmit the data to the switch. Then, according to the recognition, the switch connects the routes, either route 200 and route 202 or route 201 and route 202, and outputs the data to single route 202 formed on the second substrate.

In the above description, a cycle is used to determine the data speed, but a half cycle can also be used to determine the data speed. That is, a circuit may be set for buffer 129 and selector 127 to be driven by the half cycle based on a clock signal from cycle determining element 122. The selector picks up the determined result at the accumulator every half cycle (the accumulator does not generate the accumulated determined result by adding the first determined result and second determined result. Based on each of the first determined result and the second determined result, the selector outputs data every half cycle.)

The above description is about a transmission method from the first substrate to the second substrate. Components such as logic and switching element may also be mounted on the second substrate.

The transmission from the second substrate to the first substrate may also be conducted through either optical or electrical circuit, selected by using the switching element according to the transmission data.

The transmission from the second substrate to the first substrate may be conducted through the electrical circuit only.

Figure 4:
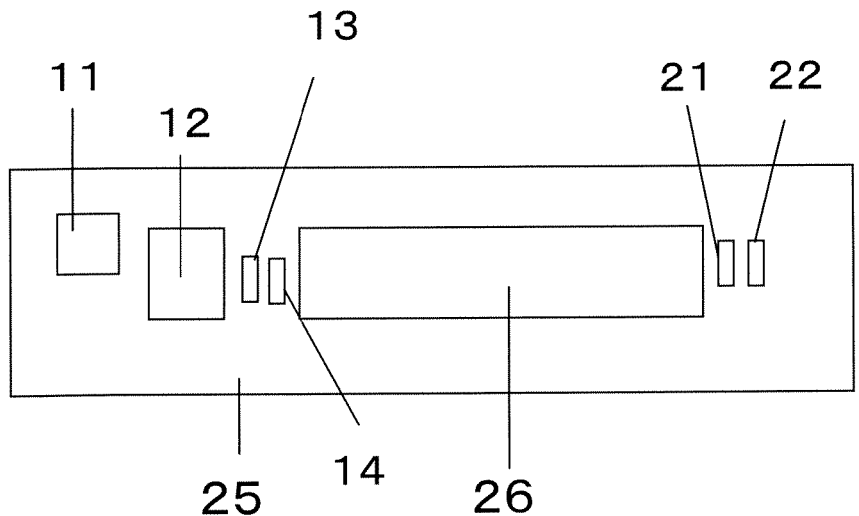
FIG. 4 is a view illustrating an optical-electrical transmitting device according to another embodiment of the present invention.

FIG. 4 is a view illustrating an optical-electrical transmitting device according to another embodiment of the present invention. Referring to FIG. 4, an optical-electrical transmitting device includes logic 11, switching element 12, driver 13, laser diode 14, photodiode 21, amplifier 22 and optical waveguide 26 are mounted on one flexible substrate 25.

Figure 5:
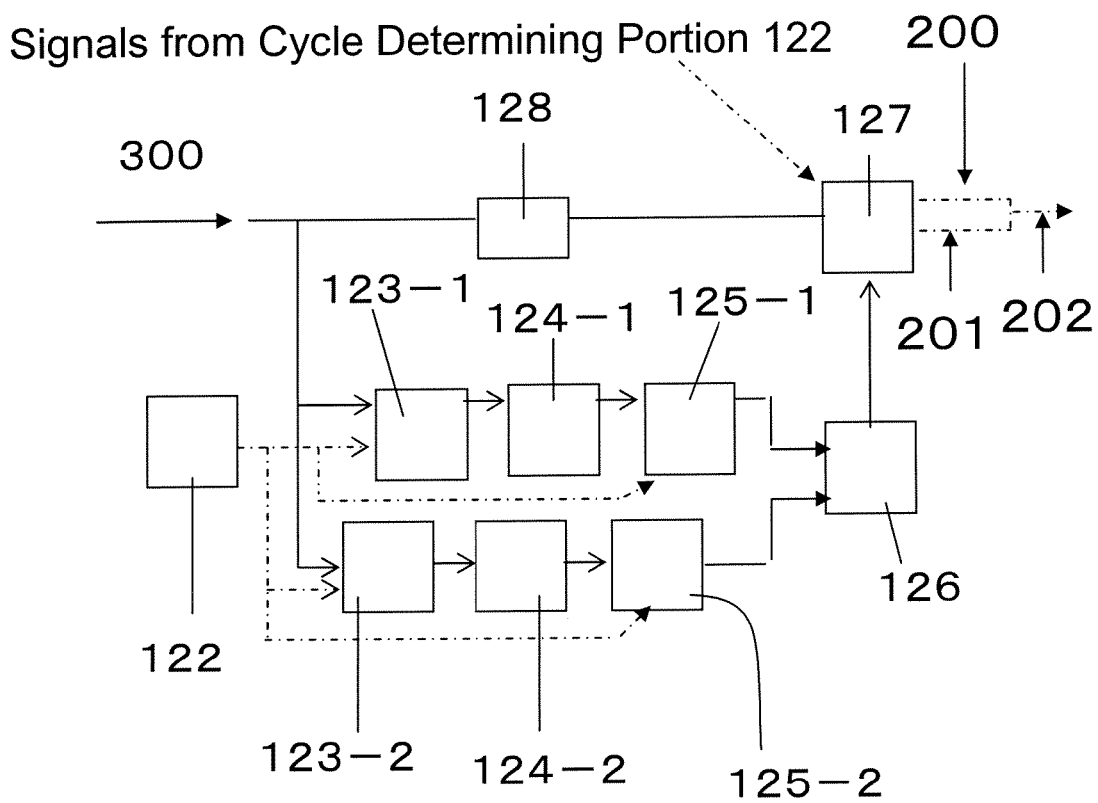
FIG. 5 is a schematic diagram illustrating a switching element of the optical-electrical transmitting device shown in FIG. 4.

By sandwiching the optical waveguide, first region where components such as logic 11, switching element 12, driver 13, and laser diode 14 are mounted, and second region where components such as photodiode 21, and amplifier 22 are mounted, are arranged. Data transmission between the first region and the second region is conducted by using optical waveguide 26 or an electrical circuit connecting the first region and the second region. As in the previous embodiment, the optical waveguide may be formed on flexible substrate 25 (equivalent of transmission substrate 3 in Embodiment 1), or may also be formed on another flexible substrate, which is then laminated on flexible substrate 25. FIG. 5 is a schematic diagram illustrating a switching element of the optical-electrical transmitting device shown in FIG. 4. In this embodiment, input data 300 are processed at the switching element, and level converter 121 in the previous embodiment is not provided. In addition, data (200, 201) which are output from selector 127 are connected to route 202 without passing through switch 130. Also, buffer 129 is not provided.

To determine the data speed, processing (processing time) is carried out at the counter, comparator, retaining circuit and accumulator. Therefore, in this embodiment, where a buffer is not provided, input data 300 reach the selector before the accumulated determined result is generated. Thus, in this embodiment, where a buffer is not provided, data are output from the selector to the optical circuit or electrical circuit by using the result determined at one cycle prior to the current cycle. With reference to FIG. 3, left data are output from the selector by using the result determined at right data (the data which were transmitted one cycle prior to left data). Since signals usually keep their speeds, either fast or slow, for a while, even if data were transmitted from the selector to the transmission substrate through a wrong route, it would be only the first cycle or so when the data speed was changed from fast to slow or slow to fast.

In this embodiment, level converter 121, buffer 129 and switch 130 may be provided as in the previous embodiment.

The buffer may be built into the selector circuit.

Either buffer 130 or delay line 129 may be provided. Data may be transmitted directly to selector 127 without passing through buffer 130 and delay line 129.

Referring to FIGS. 1 and 4, logic 11 is mounted on the substrate, but logic 11 may be excluded.

Optical-electrical transmitting devices according to the embodiments of the present invention is suitably used on mobile equipment. It is preferable to use the first substrate (first region) as a body (where the keyboard is provided) and to use the second substrate (second region) as an image display.

The switching element may be built into the driver.

To switch between the optical transmission circuit and electrical transmission circuit, on/off signals on mobile equipment (for example, on/off signals for a sleep mode) may be used.

The foregoing embodiments according to the present invention is related to an optical-electrical transmitting device, which selects either an optical or electrical transmission means according to data speed in transmitting data between substrates.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An optical-electrical transmitting device for transmitting a signal, comprising:
   an electrical signal transmitting circuit which divides a transmission signal into a first transmission signal and a second transmission signal;
   a switching device which is electrically connected to receive and converts the first transmission signal into an identification signal for determining the transmission signal to be one of a fast signal and a slow signal according to data speed; and
   a selector which is electrically connected to receive the second transmission signal and the identification signal and outputs the second transmission signal to an optical waveguide when the transmission signal is determined to be the fast signal and an electrical wiring when the transmission signal is determined to be the slow signal, the optical waveguide optically connecting the electrical signal transmitting circuit to an electrical signal receiving circuit, the electrical wiring electrically connecting the electrical signal transmitting circuit to the electrical signal receiving circuit, wherein the switching device comprises a cycle determining device which determines a cycle, a first counter which counts a first set of numbers of transmissions within the cycle, a first comparator which compares the first set of number with a number retained in the first comparator, a first retaining device which retains a result from the first comparator for the cycle, a second counter which counts a second set of numbers of transmissions within the cycle, a second comparator which compares the second set of number with a number retained in the second comparator, a second retaining device which retains a result from the second comparator for the cycle, and an accumulator which accumulate the results received from the first and second retaining devices.

2. The optical-electrical transmitting device according to claim 1, wherein the first and second counters counts the first and second sets of numbers of transmissions by a multiple of every one half of the cycle determined by the cycle determining device.

3. The optical-electrical transmitting device according to claim 1, wherein the cycle determining device is a variable cycle-type cycle determining device.

4. The optical-electrical transmitting device according to claim 1, further comprising a delay line, wherein the selector receives the second transmission signal through the delay line.

5. The optical-electrical transmitting device according to claim 1, further comprising a buffer, wherein the selector receives the second transmission signal through the buffer and the cycle determining device transmits a signal for the cycle.

6. The optical-electrical transmitting device according to claim 1, wherein the electrical signal receiving circuit includes a switch which receives a signal of the result accumulated and output from the accumulator and determines to output a signal from one of the optical waveguide and the electrical wiring according to the signal of the result.

7. The optical-electrical transmitting device according to claim 1, further comprising a level converter which converts Vcc and ground of input data to a predetermined Vcc-constant and ground-constant.

8. The optical-electrical transmitting device according to claim 1, wherein the switching device outputs the second transmission signal to one of the optical waveguide and the electrical wiring by a multiple of every one half of the cycle determined by the cycle determining device.

9. The optical-electrical transmitting device according to claim 1, wherein the switching device comprises means for determining a cycle, means for counting a first set of numbers of transmissions within the cycle, means for comparing the first set of number with a number retained in the means for comparing the first set of number, means for retaining a result from the means for comparing the first set of number for the cycle, means for counting a second set of numbers of transmissions within the cycle, means for comparing the second set of number with a number retained in the means for comparing the second set of number, means for retaining a result from the means for comparing the second set of number for the cycle, and means for accumulating the results received from the means for retaining the results.

10. An optical interconnect device comprising the optical-electrical transmitting device according to claim 1.

11. A mobile equipment device comprising the optical-electrical transmitting device according to claim 1.

12. The optical-electrical transmitting device according to claim 1, wherein the first counter counts the first set of numbers of transmissions within a first half of the cycle, and the second counter counts the second set of numbers of transmissions within a second half of the cycle.

13. The optical-electrical transmitting device according to claim 1, further comprising a level converter which converts high and low levels of input data to a predetermined high and low constants.

14. An optical-electrical transmitting device for transmitting a signal, comprising:
a buffer;
an electrical signal transmitting circuit which divides a transmission signal into a first transmission signal and a second transmission signal;
means for converting the first signal into an identification signal for determining the transmission signal to be one of a fast signal and a slow signal according to data speed; and
means for outputting the second transmission signal to an optical waveguide when the transmission signal is determined to be the fast signal and an electrical wiring when the transmission signal is determined to be the slow signal, the optical waveguide optically connecting the electrical signal transmitting circuit to an electrical signal receiving circuit, the electrical wiring electrically connecting the electrical signal transmitting circuit to the electrical signal receiving circuit,
wherein the means for outputting the second transmission signal receives the second transmission signal through the buffer and the means for converting the first signal into the identification signal transmits a signal for a cycle.

15. The optical-electrical transmitting device according to claim 14, further comprising a delay line, wherein the means for outputting the second transmission signal to one of the optical waveguide and the electrical wiring receives the second transmission signal through the delay line.

16. The optical-electrical transmitting device according to claim 14, wherein the electrical signal receiving circuit includes a switch which receives a signal of a result accumulated and output from the means for converting and determine to output a signal from one of the optical waveguide and the electrical wiring based on the signal of the result.

17. The optical-electrical transmitting device according to claim 14, further comprising means for converting Vcc and ground of input data to a predetermined Vcc-constant and ground-constant.

18. The optical-electrical transmitting device according to claim 14, wherein the means for converting the first signal into the identification signal outputs the second transmission signal to one of the optical waveguide and the electrical wiring by a multiple of every one half of a cycle determined by the means for converting the first signal into the identification signal.

* * * * *